Aug. 20, 1957 J. A. SWANN 2,803,088
EDUCATIONAL TOY CONSTRUCTION
Filed July 20, 1954 2 Sheets-Sheet 1
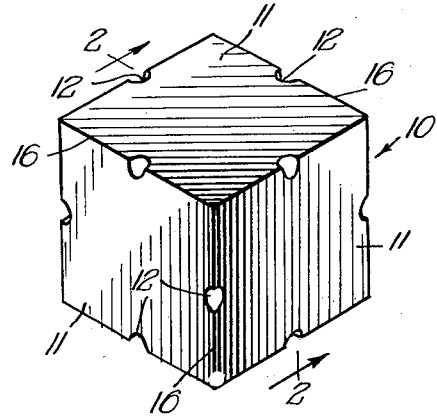
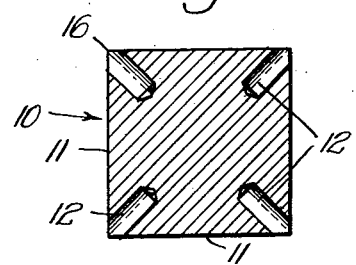
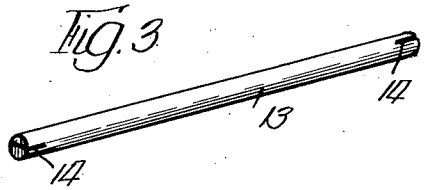
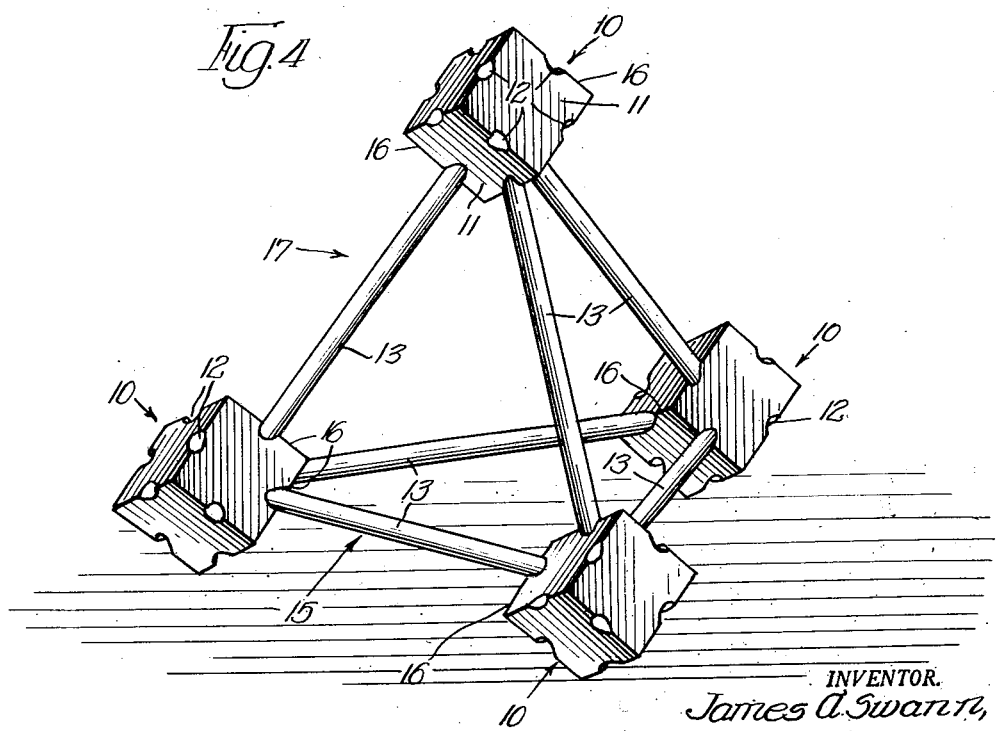
INVENTOR.
James A. Swann,
BY
Cromwell, Greist & Warden
Attys.

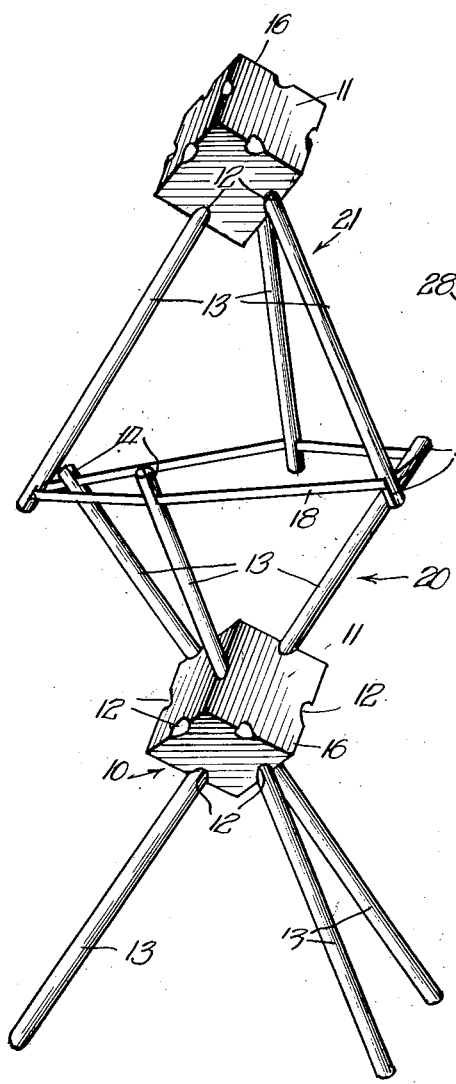
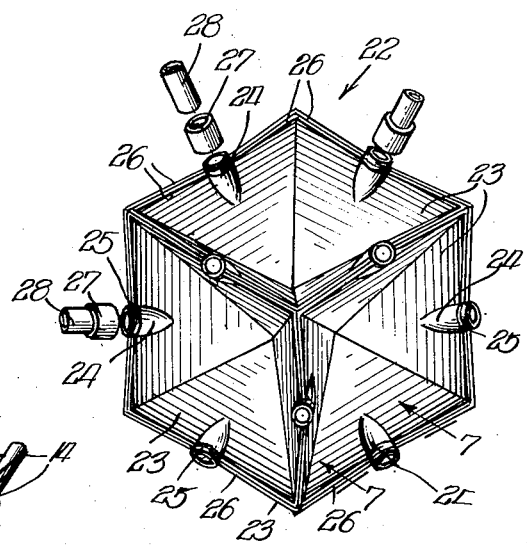
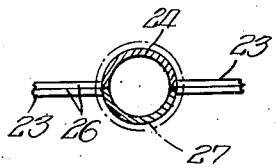

United States Patent Office 2,803,088
Patented Aug. 20, 1957

2,803,088

EDUCATIONAL TOY CONSTRUCTION

James A. Swann, Chicago, Ill.

Application July 20, 1954, Serial No. 444,538

4 Claims. (Cl. 46—17)

The present invention relates to an improved educational toy construction and kit to entertain and progressively stimulate the ingenuity of children throughout much of the growing pattern of their experience. It develops the initiative, intelligence and ingenuity of the child in many different and progressively more challenging ways by offering the possibility, by using only a very few different but extremely simple component parts, of constructing basic geometric shapes and also a practically infinitely variable choice of increasingly complicated structures, all evolved from different combinations of the basic outlines.

It is an object of the invention to accomplish these objectives by providing a kit of toy parts which are so simple that their appeal to a child will be instant, and which will at once suggest to the child the intended scheme of using the same in constructing basic and more involved geometric figures. However, it will be apparent as the description proceeds, that the uses of the related parts of the construction kit with which the invention deals are not limited to those of an educational toy. In the provision of two sets of specially related, respectively uniform, and in fact identical parts, it will be seen that the principle of the invention has multiple applications. It may be carried over into classroom demonstration work, for example, and can be translated, with simple practical variations of the parts of the kit, into the field of space frame construction, as in the building of steel rod trussing.

The components of the improved kit are a number of basic connector members, blocks or cubes and a number of elongated coupling rods or dowels. The dowels are preferably of equal length, although sets of dowels of different respective lengths are permissible, in which case the possible uses of the kit may be further expanded by center surface drilling of the connectors; but in any case, and like the basic members, the dowels are otherwise entirely uniform in their physical characteristics. The basic connector members may be solid or non-solid in cross section and may be of integral, one-piece construction or of assembled, built-up construction. However, in any embodiment thereof, it is an essential feature that the blocks be provided at each line of intersection of each pair of adjacent cube faces or surfaces, and preferably at the midpoint of the line, with a coupling to receive a coupling dowel formation.

In a simple adaptation of the invention the formation will be represented by a dowel receiving opening in a solid block or cube, disposed at an angle of 45° to each of the respective surfaces on whose line of intersection it is formed. In a multi-part cube the coupling formation will be of different and more complex character, as will be described; but in any embodiment the coupling formations are located at the lines of intersection of surface planes of the basic connector member, actual or theoretical, and lie in three planes cutting those surfaces at 90° to one another.

The coupling dowels are frictionally or otherwise engaged with the coupling formation of the basic cube, with the result that each pair of successive, most closely adjacent coupling dowels, i. e., dowels coupled to two edges each defined in part by a common surface plane, project from those edges at an angle of 60° to one another.

When any group of three or more connector cubes are coupled in this fashion a simple or complex geometric figure results. It is possible to construct shapes which are symmetric or asymmetric, as in cubical crystallography, and they may be disposed in any desired orientation, i. e., resting upon the corners of certain of the basic connector cubes or upon the flat surfaces of two or more thereof. Commencing, for example, with a simple basic, plane polyhedron of, say, triangular outline, other much more complex geometric shapes are readily constructed from the basic cubes and coupling dowels. Thus, to construct the outline of a tetrahedron will involve the use of four basic connectors and six coupling dowels, while to make an octahedron will require six connectors and twelve dowels.

In the simplest embodiment of a construction built-up in accordance with the invention, as described above, the connector and coupling elements are all rigidly though releasably engaged with one another, as by the frictional engagement of the coupling dowels in the coupling formations of the connector blocks. In a somewhat modified adaptation two preassembled shapes composed of blocks and dowels may be flexibly united with one another by means of a flexible or resilient support, thus obtaining a composite construction in which relative movement of the two component shapes or units, upwardly, downwardly and sidewards is possible. As an example, a lower unit may be constructed as a tripod, with another built-up unit yieldably superimposed thereon through the agency of an elastic band applied to projecting coupling elements associated with the tripod. This imparts a very desirable mobility to the composite form which unquestionably attracts a child and further stimulates his imagination and initiative in the evolution of still more challenging forms.

A still further modification of the invention, as regards the individual basic blocks, involves the assembly of each from a plurality of parts. Thus a child or other user is further challenged at the outset in the putting together of each basic connector member, which is thereupon used in the same general manner as described above in building-up geometric shapes. Considered more specifically in this last aspect, the invention contemplates that the parts going into the making of such a multiple piece, composite block unit shall be in the form of individual hollow pyramids molded from a plastic composition. Furthermore, improved provisions are made to secure the pyramid pieces in a proper nested relation to one another, which provisions at the same time serve to afford the coupling formations for the basic member. They are used in the same general fashion as referred to above, though differing necessarily in regard to the specific connection of dowel and block, due to the manner in which the multi-piece members are produced.

The foregoing statements are indicative in a general way of the nature of the invention. Other and more specific objects will be apparent to those skilled in the art upon a full understanding of the construction and modes of use of the improved kit and components thereof.

There are illustrated herein various adaptations of the invention, representing modifications in respect to the structural features of the basic connector member, and in respect to the manner these members are associated and united with one another to produce desired built-up forms.

In the drawings:

Fig. 1 is a perspective view of a simple form of basic connector member in accordance with one embodiment of the invention;

Fig. 2 is a view in section through the member or block along a line corresponding to line 2—2 of Fig. 1;

Fig. 3 is a perspective view of a dowel-like coupling element used in association with the basic member of Figs. 1 and 2;

Fig. 4 is a perspective view of a simple geometric form built-up from the members shown in Figs. 1, 2 and 3;

Fig. 5 is a perspective view of a composite, flexibly coupled form constructed in accordance with a modified adaptation of the invention;

Fig. 6 is a perspective view of a basic connector or construction member composed of a number of special, nestingly interfitted parts, in accordance with a still further embodiment of the invention; and Fig. 7 is a view in enlarged scale section on line 7—7 of Fig. 6.

A basic connector member 10 of the improved construction kit is illustrated in Figs. 1 and 2. It is a solid block having six identical square faces 11 intersecting at a right angle to one another. Cube 10 may be other than solid in character, for example being produced in a hollow form in the manner of a child's alphabet or building block from molded parts of a suitable plastic material, so long as appropriate provisions are made, as they are in cube 10, in the form of coupling formations 12 at the midpoint of the line of intersection of each pair of intersecting, 90° related surfaces 11.

As shown, formations 12 are inwardly extending holes of circular cross section arranged in three planes intersecting the surfaces 11 and one another at 90°; and the axis of each hole is at 45° to the intersecting surfaces, hence is on a line through the geometric center of the member 10. Thus the axes of successive, or most closely adjacent, holes 12, i. e., which are on non-parallel lines of intersection that meet one another, are at an angle of 60° to one another.

The second component constituting the kit is an elongated coupling element 13, shown in Fig. 3 in the form of a simple dowel of hard wood or plastic. A number of these dowels are furnished along with a number of the basic cubes 10; and the dowels are preferably supplied in a uniform length, with the intent that the desired use of the kit will primarily involve the construction of entirely conventional and symmetric geometric figures. However, coupling dowels 13 of differing lengths may also be provided, if desired. Each thereof is provided at the opposite ends thereof with a centrally arranged, inwardly extending slot 14 to lend springiness to the dowel ends. This enables the same to be readily inserted in coupling holes 12 of the basic member and to be held engaged therein by spring frictional action.

Fig. 4 of the drawings depicts a simple, indeed basic, geometrical form and shows how the kit is intended to be used in producing the same, while Fig. 5 represents a more complex, flexibly coupled composite form. However, in the main and insofar as the manipulation of the members 10, 13 relative to one another is concerned, the same principle prevails in each case.

A basic triangular substructure 15, as shown in Fig. 4, is composed of three of the basic cubes 10 interconnected in the manner described by three dowels 13, which extend from the midpoints of inwardly and upwardly inclined intersection edges 16 of three surfaces 11. The dowels referred to are arranged in coplanar, horizontal position. Thus substructure cubes 10 each rest on a corner defined by the three intersecting surfaces in question, and corresponding surfaces of the respective members 10 are all parallel.

A superstructure 17 completes the form, this superstructure being of a three-sided pyramidal outline. It is composed of an upper cube 10 which is disposed with diametrically opposed corners thereof in a vertical line running through the geometric midpoint of triangular substructure 15 therebelow. Its respective surfaces parallel the surface of the substructure cubes. Inwardly and upwardly convergent dowels 13 extend from an inner upwardly exposed intersection edge 16 of each cube into the midpoints of the intersecting edges of the four downwardly facing surfaces of the upper cube, which thus acts as a keystone locking the structure. It is evident that the geometrical form shown in Fig. 4 will at once suggest various refinements and ramifications adding to the complexity thereof, hence the interest in constructing the same. A practically endless variety of different forms can be constructed with the arrangement of Fig. 4 as a basis.

The adaptation of Fig. 5 represents a development in which an additional element is employed to impart mobility to the structure as a whole. This element may be a single elongated rubber band or a number of such rubber bands, generally designated by the reference numeral 18. As one of a number of possibilities stemming from this concept, a lower tripod-like substructure 19 may be built up of three dowels 13 frictionally engaged in the downwardly facing coupling holes 12 of a basic cube. The upwardly exposed holes in turn have further dowels 13 frictionally engaged therein, so as to define an upwardly extending, radially spread superstructure 20. A resilient or elastic element 18 is applied to this structure adjacent the top thereof, being hooked or threaded around the dowel end slots 14, resulting in an elastic, cushion support on which may be engaged a top floating unit 21. Unit 21 may, in a simplified version, consist of a simple tripod figure having three upright dowels engaged in downwardly opening formations 12, and the slotted lower extremities 14 of those dowels are in turn engaged in a straddling fashion with the midpoints of the reaches of each floating cushion element 18 spanning successive superstructure dowels. A hexagonal cushion is provided for top unit 21, rendering the same movable from side to side as well as up and down. Mobility of this sort affords further entertainment, stimulation and instruction for the user. A composite shape such as shown in Fig. 5 may be ramified and further complicated by hooking the same up with similar or dissimilar and simple or composite formations, in a manner which is evident.

Reference has been made to the fact that the basic cube or block elements may be of non-solid construction or solid, embodied in Figs. 1 through 5, and the embodiment of the invention appearing in Figs. 6 and 7 illustrates an improvement in this respect. In this form, the ultimate basic block or connecting member is designated 22. It is of multi-part construction, as will any other basic unit constructed in the improved fashion, whether of cubical outline or otherwise, being built up of a number of hollow, pyramid-shaped elements 23, shown as six in number. These are injection molded from a suitable plastic composition in any desired color or colors. The cross section of the pyramid elements is square, so that when six thereof are internested with one another, a member 22 of cubical outline will result, having six theoretical outer planes disposed in equally spaced pairs, which pairs intersect one another at right angles.

The invention further comprises an improvement in the manner of holding the elements together to constitute such a cube or any desired subordinate portion thereof. For this purpose, each of the triangular sides of a pyramid element 23 is molded to provide a concave, semi-tubular nipple portion or section 24, the concavity opening outwardly of the pyramid side wall and being approximately semi-circular in shape and the convex rounded surface of the formation is disposed inwardly of the pyramid wall. Each of these half nipple elements is molded with an external thread configuration 25 on a portion thereof projecting outwardly of the free edge 26 of the pyramid wall, and in order to bring the outer extremity of this threaded nipple flush with the corners of the pyramid, the free edges 26 are relieved or angled inwardly somewhat.

In assembling a pair of the thus constituted pyramidal elements together, adjacent walls thereof are placed in side by side engagement, so that the half nipple elements 24 thereof match and constitute an outwardly projecting, generally circular nipple. A plastic cylindrical sleeve or union 27 is then screwed onto the nipple, holding the parts firmly together. Thus, when a threaded plastic dowel 28 is screwed into the outer end of the nipple 27 a coupled connection results which is functionally identical to those illustrated in the embodiments of Figs. 1 through 5 and, in addition, the coupling sleeve acts to hold component parts of the cube 22 together.

A cube-shaped member 22, or a member having theoretical side surfaces less in number than does a cube, may be optionally built up by assembling pyramid elements in the fashion described. Cube 22 is employed in exactly the same way as described above in building various geometrical constructions. It is evident that the elements 23 may be of a single color, or of many attractive and contrasting colors, thereby adding a possible further incentive to the user in the assembly of the blocks and built-up shapes.

I claim:

1. A composite built-up construction comprising a plurality of like connector members of generally cubical form each provided with a plurality of outwardly facing coupling formations arranged in equal spacing in three planes intersecting one another at a 90° angle, said formations being located solely at the midpoints of lines of intersection of external surface planes of said members, elongated, dowel-like coupling elements engaged with said coupling formations to extend outwardly of the respective members at 60° to one another, a flexible support extending between some of the ends of said coupling elements remote from their respective connector members to impart mobility to said construction.

2. A composite built-up construction comprising a plurality of like connector members of generally cubical form provided with a plurality of outwardly facing coupling formations arranged in equal spacing in three planes intersecting one another at a 90° angle, said formations being located solely at the midpoints of lines of intersection of external surface planes of said members, elongated, dowel-like coupling elements engaged with said coupling formations of a first connector member to extend outwardly thereof in opposite directions at 60° to one another with respect to each direction, a flexible, ring-like support extending between the coupling elements extending in one direction in substantially spaced relation to said first connector member, and a further unit mounted on said flexible support, said further unit being composed of a second connector member having at least two of said coupling elements engaged with the coupling formations thereof and sustained at their remote ends by said flexible support to impart mobility to said construction.

3. Combinable space frame construction elements adapted for interconnection in varied relations, said elements comprising a plurality of elongated dowel-like coupling elements and at least one connector element, said connector element being in the form of a composite unit made up of a plurality of hollow pyramid-shaped elements releasably held in interfitting relation to one another to include a plurality of face surfaces defined by lines of intersection, each of said lines of intersection having no more than one coupling element receiving aperture therein opening outwardly with respect to said face surfaces and being defined by coupling formations comprised of integral portions on said pyramid-shaped elements extending outwardly of free edges thereof adapted to hold the same in interfitted relation, each of said apertures positioned at the midpoint of its respective lines of intersection.

4. Combinable space frame construction elements adapted for interconnection in varied relations, said elements comprising a plurality of elongated dowel-like coupling elements and at least one connector element, said connector element being in the form of a composite unit made up of a plurality of hollow pyramid-shaped elements releasably held in interfitting relation to one another and including a plurality of face surfaces defined by lines of intersection, each of said lines of intersection having no more than one coupling element receiving aperture therein opening outwardly with respect to said face surfaces and being defined by coupling formations comprising an integral outward extension on a free edge of a side surface of said hollow pyramid-shaped elements which is adapted in conjunction with a similar extension of another hollow pyramid-shaped element to retainingly receive one of said coupling elements, each of said apertures positioned at the midpoint of its respective lines of intersection.

References Cited in the file of this patent
UNITED STATES PATENTS 1,472,536     Thomson _____ Oct. 30, 1923